3,594,358
CATALYST COMPOSITION, PROCESS OF PREPARATION, AND POLYMERIZATION PROCESS AND PRODUCT
Charles W. Moberly, Bartlesville, Okla., assignor to Phillips Petroleum Company
No Drawing. Continuation-in-part of application Ser. No. 401,689, Oct. 5, 1964. This application Sept. 28, 1967, Ser. No. 671,240
Int. Cl. C08f 3/30, 29/00, 33/00
U.S. Cl. 260—92.8          7 Claims

ABSTRACT OF THE DISCLOSURE

A preformed stable free radical catalyst is formed by impregnating a free radical precursor on solid particles of a polymer of at least one vinyl monomer. The preformed catalyst can be utilized to polymerize substituted vinyl monomers. The polymer production rate and the yield in vapor phase polymerization is increased by incorporating a small amount of a hydrocarbon selected from the group consisting of alkanes, cycloalkanes and aromatics.

---

This is a continuation-in-part of application Ser. No. 401,689, filed Oct. 5, 1964, and now abandoned.

This invention relates to novel catalyst compositions, a process for preparing such catalyst compositions, a polymerization process utilizing such catalyst compositions, a technique for increasing the polymer yield in such polymerization processes and the resulting polymerization products. In one aspect the invention relates to preformed, stable compositions comprising free radicals attached to a polymer support. In another aspect the invention relates to the preparation of a novel free radical catalyst comprising free radicals impregnated on a polymer support. In yet another aspect the invention relates to the polymerization of a vinyl monomer in the presence of a novel catalyst comprising free radicals on a polymer support and to the resulting substantially ash-free polymerization productions. In a further aspect the invention relates to a novel process for blending two polymers and to the resulting blend. In yet another aspect the invention relates to a method for increasing the polymer production rate and the yield in a vapor phase polymerization process utilizing a catalyst comprising free radicals on a polymer support.

Free radicals are usually formed by breaking chemical bonds, and thus they will normally be formed in pairs. Free radicals have been described as atoms or molecules which are electrically neutral while almost always having an odd number of electrons. For example, atomic hydrogen has one electron and the methyl radical has seven. The unpaired electron accounts, in part, for the high reactivity and very short life of free radicals. The unpaired electron seeks a more stable condition by pairing with another odd (unpaired) electron. Therefore, high concentrations of free radicals are difficult to obtain.

Several studies have been made in an effort to trap and identify organic free radicals in various matrices. Since free radicals represent a concentrated source of energy and are important as catalysts, and have other purposes, there have been suggested various means for the production and trapping (storage) of these reactive species. For example, it is known that some free radicals can be generated in an electrical discharge, or produced by irradiation, and subsequently trapped by condensing at temperatures of liquid helium (4.2° K.).

In one prior art method the solid free radical precursor is first irradiated with gamma rays to bring about dissociation and formation of radicals. However, most of the successful trapping of radicals so far has been at 4 to 20° K., a temperature very difficult and expensive to achieve.

Recently it has been discovered that free radicals can be generated, trapped and stabilized at atmospheric temperatures on a support selected from silica, alumina and silica-alumina, as disclosed by Alfred Clark in U.S. Pat. 3,136,729, issued June 9, 1964. However, the use of alumina, silica or silica-alumina as a catalyst support results in a polymer containing such material. In many situations it is desired that the polymer product contain a minimum of such inorganic material, or in other words have a low ash content. Processing the polymer to remove such inorganic material is both time-consuming and expensive.

Accordingly, it has become desirable to find a free radical catalyst which can be produced at substantially atmospheric conditions and can be utilized to produce a substantially ash-free polymer. It is also desirable to be able to preform the catalyst and to store such preformed catalyst. In accordance with the invention, it has been discovered that such a desired catalyst can be prepared by contacting a polymer support with a free radical precursor and further that a polymerization process utilizing such a catalyst provides increased yield of polymer, with the polymer being substantially ash-free. The process can also be utilized to blend two or more polymers. It has further been discovered that the polymer production rate and yield in a vapor phase polymerization process utilizing such a catalyst can be significantly increased by adding to the catalyst a small amount of a hydrocarbon selected from the group consisting of alkanes, cycloalkanes, and aromatics.

Accordingly, it is an object of the invention to provide a novel catalyst composition comprising free radical precursors. It is a further object of the invention to provide a novel free radical catalyst which can be prepared at substantially atmospheric conditions. It is also an object of the invention to provide a free radical catalyst which can be utilized to produce a substantially ash-free polymer. Another object of the invention is to provide a novel process for blending two or more polymers. Yet another object of the invention is to provide a novel process for producing a substantially ash-free polymer. Another object of the invention is to provide a novel blend of polymers. A further object of the invention is to increase the polymer yield and production rate.

Other aspects, objects, and advantages of the invention will be apparent from a study of the disclosure and the appended claims.

FREE RADICAL PRECURSORS

In general, free radicals can be defined as "a molecule or part of a molecule in which the normal chemical binding has been modified so that an unpaired electron is left associated with the system." One group of compounds which are particularly suitable is the hexahalogen ethanes characterized by the following structure:

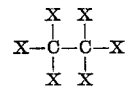

wherein each X is a halogen selected from the group fluorine, chlorine, bromine, and iodine. These compounds include
hexachloroethane,
hexafluoroethane,
hexabromoethane,
hexaiodoethane,
1,1,1-trichloro-2,2,2-trifluoroethane,
1,1,2-trichloro-1,2,2,-trifluoroethane,
1,1,1-tribromo-2,2,2-trichloroethane, 1,2,2-tribromo-1,1,2-trichloroethane,
1,1,1-trichloro-2,2,2-triiodoethane,
1,1,2-trichloro-1,2,2-triiodoethane,
1,1,1-tribromo-2,2,2-trifluoroethane,
1,1,2-tribromo-1,2,2-trifluoroethane,
1,1,1-trifluoro-2,2,2-triiodoethane,
1,1,2-trifluoro-1,2,2-triiodoethane,
1,1,2-tribomo-1,2,2-triiodoethane,
1,1-dichloro-1,2,2,2-tetrafluoroethane,
1-chloro-1,1,2,2,2-pentafluoroethane,
1,1,2,2-tetrachloro-1,2-difluoroethane,
1,1,2,2-tetrachloro-1,2-diiodoethane,
1-chloro-1,1,2,2,2-pentaiodoethane,
1,1-dibromo-1,2,2,2-tetrachloroethane,
1,1,1,2,2-pentabromo-2-chloroethane,
1,2-dibromo-1,1,2,2-tetrafluoroethane,
1,1,2,2-tetrabromo-1,2-diiodoethane,
1,1,1,2,2-pentafluoro-2-iodoethane and the like.

Another group of compounds which are suitable for use as free radical precursors are peroxides having the structure:

R—O—O—R wherein each R is selected from the group consisting of alkyl, cycloalkyl, aryl, alkaryl, aralkyl, and acyl radicals containing from 1 to 15 carbon atoms. Examples of suitable organic peroxides include dimethyl peroxide,
methyl ethyl peroxide,
di-tert-butyl peroxide,
di-tert-amyl peroxide,
di-n-hexyl peroxide,
n-butyl n-amyl peroxide,
dicyclohexyl peroxide,
dicyclopentyl peroxide,
di(methylcyclohexyl) peroxide,
diphenyl peroxide,
di-4-tolyl peroxide,
di(2,4,6-trimethylphenyl) peroxide,
phenyl benzyl peroxide,
tert-butyl phenyl peroxide,
dibenzoyl peroxide,
diacetyl peroxide,
dibenzyl peroxide,
bis(alpha-methylbenzyl) peroxide,
bis(alpha-ethylbenzyl) peroxide,
bis(alpha-n-propylbenzyl) peroxide,
bis(alpha-isopropylbenzyl) peroxide,
bis(alpha,alpha-dimethylbenzyl) peroxide (also referred to as dicumyl peroxide),
bis(alpha,alpha-diethylbenzyl) peroxide,
bis(alpha,alpha-di-n-propylbenzyl) peroxide,
bis(alpha,alpha-diisopropylbenzyl) peroxide,
bis(alpha-methyl-alpha-ethylbenzyl) peroxide,
bis(alpha-ethyl-alpha-isopropylbenzyl) peroxide,
bis(alpha-methyl-alpha-tert-butylbenzyl) peroxide,
bis(alpha,alpha-dimethyl-3-methylbenzyl) peroxide,
bis(alpha,alpha-diethyl-2-ethylbenzyl) peroxide,
bis(alpha-methyl-alpha-ethyl-3-tert-butylbenzyl) peroxide,
bis(alpha,alpha-dimethyl-2,4-dimethylbenzyl) peroxide,
bis(alpha,alpha-dimethyl-4-isopropylbenzyl) peroxide,
bis(alpha,alpha-diisopropyl-4-ethylbenzyl) peroxide,
bis(alpha-methyl-alpha-ethyl-4-isopropylbenzyl) peroxide,
bis(alpha,alpha-diethyl-4-isopropylbenzyl) peroxide,
bis(alpha,alpha-diisopropyl-2-ethylbenzyl) peroxide,
bis(alpha,alpha-dimethyl-4-tert-butylbenzyl) peroxide,
bis(alpha,alpha-diethyl-4-tert-butylbenzyl) peroxide,
benzyl alpha-methylbenzyl peroxide,
benzyl alpha-methyl-4-methylbenzyl peroxide,
benzyl alpha-methyl-4-isopropylbenzyl peroxide,
benzyl alpha,alpha-dimethylbenzyl peroxide,
benzyl alpha,alpha-dimethyl-4-methylbenzyl peroxide,
benzyl alpha,alpha-dimethylbenzyl-4-isopropylbenzyl peroxide,
alpha,alpha,alpha'-trimethyldibenzyl peroxide,
alpha-methyl-alpha,alpha'-diethyl-alpha'-n-propyldibenzyl peroxide,
alpha-methyl-alpha,alpha',alpha'-triisopropyl-dibenzyl peroxide,
alpha,alpha-dimethyl-alpha',alpha'-di-n-butyldibenzyl peroxide,
bis[dimethyl(1-naphthyl)methyl] peroxide,
bis[diethyl(2-naphthyl)methyl] peroxide, and combinations thereof. Other unsymmetrical peroxides such as isopropylbenzene hydroperoxide, p-menthane hydroperoxide, tert-butylisopropylbenzene hydroperoxide, diisopropylbenzene hydroperoxide, triisopropylbenzene hydroperoxide, cyclohexylbenzene hydroperoxide, tert-butyl-isobutylbenzene hydroperoxide, and the like can also be used. Naturally occurring peroxides, such as ascaridole, can also be used. Acetyl cyclohexane sulfonyl peroxide and isobutylperoxide can be used.

The dialkyl peroxy dicarbonates, represented by the formula:

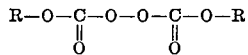

wherein each R is an alkyl group containing from 1 to 6 carbon atoms, have been found to be particularly useful, with diisopropyl peroxy dicarbonate being presently preferred because of its stability.

Other peroxy compounds that can be used include isobutyryl peroxide, acetyl cyclohexane sulfonyl peroxide, tert-butyl peroxypivalate, and the like. Another group of compounds that can be used includes the substituted hydrazines such as tetraphenylhydrazine, symmetrical diphenylhydrazine, and the like.

Other employable free radical precursors are the azo compounds, such as 2,2'-azobis(isobutyronitrile), diazoaminobenzene, dichloroazocarbonamidine, and these can also be used. In fact, any known free radical precursor—many of which are known to the industry—can be used. Suitable additional free radical precursors are listed, for example, in the Faraday Society Symposium on Free Radicals, London, 1953; in the Chemical Society Symposium on Free Radicals, London, 1957; and in the book Free Radicals by Ingram, Academic Press, Inc., New York, 1958.

POLYMER SUPPORT

Polymers which can be utilized as supports for the free radical precursors include homopolymers and copolymers of monomers having the structure:

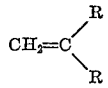

where R is selected from the group consisting of hydrogen, halogen, furyl, pyridyl, carbazolyl, alkyl, aralkyl, cycloalkyl, aryl, alkaryl, alkenyl, alkynyl, halogen substituted aryl, halogen substituted alkaryl, halogen substituted alkenyl, halogen substituted alkynyl, halogen substituted alkyl, halogen substituted aralkyl, halogen substituted cycloalkyl, alkoxy substituted aryl, alkoxy substituted alkaryl, alkoxy substituted alkenyl, alkoxy substituted alkynyl, alkoxy substituted alkyl, alkoxy substituted aralkyl, alkoxy substituted cycloalkyl, alkenylaryl, —COOR', —CONR'$_2$, —C≡N, —COR', —OR', and R'COO—, where R' is selected from the group consisting of hydrogen alkyl, aryl, alkaryl and aralkyl, the number of carbon atoms in each R being less than 21.

Some examples of monomers which can be polymerized alone or copolymerized together to form the polymer support for the catalyst in accordance with the invention include the olefins such as ethylene, propylene, 1-butene, 1-pentene, 4-methyl-1-pentene, 1-heptene, 1-octene, 1- decene, 3-phenylpropene-1, vinylcyclohexane, and the like; conjugated dienes such as butadiene (1,3-butadiene), 2,3-dimethyl-1,3-butadiene, isoprene, piperylene, 2-furyl-1,3-butadiene, 2-methoxy-1,3-butadiene and the like; haloprenes, such as chloroprene (2-chloro-1,3-butadiene), bromoprene, 2-ethoxy-1,3-butadiene, methylchloroprene (2-chloro-3-methyl-1,3-butadiene), and the like; aryl substituted olefins such as styrene; various alkyl styrenes such as o-ethylstyrene, m-tetradecylstyrene, and the like; p-chlorostyrene, p-vinylstyrene, m-methoxy-p-isopropylstyrene, o-chloro-p-decylstyrene, 3-bromo-4-vinylbutyne-1, p-methoxystyrene, alpha-methylstyrene, vinylnaphthalene, 4-butoxy-5-vinylpentyne-1, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, heptadecyl methacrylate, phenyl acrylate, o-tolyl methacrylate, benzyl ethacrylate, acrylonitrile, methacrylonitrile, methacrylamide, N,N-diphenylacrylamide, N,N-di-o-tolylacrylamide and the like; methyl isopropenyl ketone, methyl vinyl ketone, 1-naphthyl vinyl ketone, methyl vinyl ether, 2-anthryl vinyl ether, vinyl acetate, vinyl arachidate, vinyl chloride, vinylidene chloride, vinylfurane, vinylpyridine, vinylcarbazole, vinylacetylene and other unsaturated hydrocarbons, esters, alcohols, acids, ethers, etc. of the types described.

The polymer support is preferably utilized in a finely divided particulate solid form to provide desirable surface area and to permit intimate contact with the monomer to be polymerized. The finely divided particulate polymer solids can be obtained by any suitable manner, for example by grinding, shredding, or chopping polymer sheets, granules or filaments, or by the polymerization of the monomer to obtain finely divided particulate polymer solids in the polymerization reaction. The finely divided particulate polymer solids can be pretreated prior to contacting with the free radical precursor. Thus the particulate polymer solids can be heated to remove free water and sorbed gases. The heating can be conducted in an atmosphere of air, hydrogen, helium, nitrogen, argon or the like at atmospheric, subatmospheric or superatmospheric pressure, and at temperatures below the melting point of the polymer support.

CATALYST FORMATION

The particulate polymer solids can be contacted with the free radical precursor in any suitable manner in an atmosphere of air or an inert gas and at subatmospheric, atmospheric or superatmospheric pressure. It is presently preferred to have the free radical precursor in liquid form for ease of handling and to obtain intimate contact. This can be accomplished by using normally liquid free radical precursors, a solution of the precursor in a solvent, a dispersion of the precursor in a liquid diluent, or a precursor heated above its melting point. The precursor can be sprayed onto the support or the support can be dipped into a liquid bath of the precursor. The support and precursor can be heated until both are in the liquid phase, admixed and then cooled. Solutions of the precursors can be prepared with any suitable non-deleterious solvent. Suitable solvents are those containing from 3 to 12 carbon atoms per molecule, such as the alkanes, the naphthenes, the aromatic hydrocarbons, alcohols, ethers, ketones, and the like. Specific examples of suitable solvents include propane, butane, isobutane, pentane, isopentane, neopentane, hexane, heptane, 3-ethylhexane, octane, 2-methyloctane, decane, 2,7-dimethyloctane, dodecane, cyclopropane, cyclopentane, cyclohexane, methylcyclorexane, cyclooctane, cyclododecane, benzene, toluene, xylene, ethanol, methanol, decanol, methyl isobutyl ketone, ethyl ether, tetrahydrofuran, and the like. Of course, mixtures of these compounds are frequently employed since suitable mixtures are produced by conventional refinery operations.

The concentration of the free radical precursor in the solution is frequently in the range of 0.001 to 2 mols per liter of solution. The amount of solution which is employed is generally sufficient to provide the desired amount of precursor. The more useful compositions result from use of about .001 to 2 grams, and more preferably from 0.005 to 0.5 gram of the precursor per gram of the solid support.

It is also within the contemplation of the invention to utilize the free radical precursor in solid form alone or admixed with a solid or liquid diluent. The solid form free radical precursor can be incorporated onto the polymer support by suitable means, for example ball milling. The concentration of the precursor in a diluent is generally in the range of 0.5 to 10 weight percent of the admixture.

The temperature at which the free radical precursor is contacted with the particulate polymer solids is in the range of −50° C. to 200° C. Where the precursor is liquid or is in a liquid solution the temperature is preferably above the freezing point of the solution and below the boiling point thereof for ease of handling. The temperature can be above the softening point of the polymer support but should not reach the decomposition temperature of either the polymer support or the precursor. The contact time should be of sufficient length to provide the desired concentration of free radical precursor and generally is in the range of 1 second to several hundred hours. Excess free radical precursor solution can be removed from the catalyst or initiator by decantation, filtration, or centrifugation. The moist solids can be dried to remove the solvent by heating or vacuum distillation.

Specific examples of catalysts in accordance with the invention include: hexachloroethane on polyethylene, 1,1,2-trichloro-1,2,2-triiodoethane on polypropylene, hexabromoethane on an ethylene-propylene copolymer, hexafluoroethane on an ethylene-butene-1 copolymer, tetraphenylhydrazine on polybutadiene, symmetrical diphenylhydrazine on polyisoprene, di-tert-butyl peroxide on poly-(4-methylpentene-1), diphenyl peroxide on polychloroprene, diacetyl peroxide on polystyrene, dibenzyl peroxide on a butadiene-styrene copolymer, dibenzoyl peroxide on polyvinyl chloride, dicyclopentyl peroxide on polyvinylnaphthalene, bis(alpha-ethylbenzyl) peroxide on polyacrylic acid, tert-butyl phenyl peroxide on polymethacrylic acid, bis(alpha,alpha-dimethyl-4-tert-butylbenzyl) peroxide on polymethyl methacrylate, benzyl alpha-methyl-4-isopropylbenzyl peroxide on polyacrylonitrile, isopropylbenzene hydroperoxide on poly(methyl vinyl ketone), tert-butylisopropylbenzene hydroperoxide on polyvinyl acetate, cyclohexylbenzene hydroperoxide on polyvinylfurane, diazoaminobenzene on polyvinylcarbazole, dichloroazocarbonamidine on polyvinylacetylene, alpha-alpha-azobis(isobutyronitrile) on polyvinyl chloride, diisopropyl peroxy dicarbonate on polyvinyl chloride, diisopropyl peroxy dicarbonate on polypropylene, and the like.

MONOMERS

Monomers which can be polymerized alone or copolymerized together in accordance with the process of the invention include monomers having the structure:

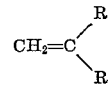

where R is selected from the group consisting of hydrogen, halogen, furyl, pyridinyl, carbazolyl, aryl, alkaryl, alkenyl, alkynyl, halogen substituted aryl, halogen substituted alkaryl, halogen substituted alkenyl, halogen substituted alknyl, alkoxy substituted aryl, alkoxy substituted alkaryl, alkoxy substituted alkenyl, alkoxy substituted alkynyl, alkenylaryl, —COOR′, —CONR$_2$′, —C≡N, —COR′, —OR′, and R′COO—, where R′ is selected from the group consisting of hydrogen, alkyl, aryl, alkaryl and aralkyl, not more than one R being hydrogen and the number of carbon atoms in each R being less than 21.

Some examples of monomers which can be polymerized alone or copolymerized together in accordance with the invention include conjugated dienes such as butadiene (1,3-butadiene), 2,3-dimethyl - 1,3 - butadiene, isoprene, piperylene, 2-furyl-1,3-butadiene, 2-methoxy-1,3-butadiene, and the like; haloprenes, such as chloroprene (2-chloro-1,3-butadiene), bromoprene, 2-ethoxy - 1,3 - butadiene, methylchlorooprene (2-chloro-3-methyl-1,3-butadiene), and the like; aryl substituted olefins such as styrene; various alkyl styrenes such as o-ethylstyrene, m-tetradecylstyrene, and the like; p-chlorostyrene, p-vinylstyrene, m-ethoxy - p - isopropylstyrene, o - chloro-p-decylstyrene, 3-bromo-4-vinylbutyne-1, p-methoxystyrene, alpha-methylstyrene, vinylnaphthalene, 4-butoxy-5-vinylpentyne-1, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, heptadecyl methacrylate, phenyl acrylate, o-tolyl methacrylate, benzyl ethacrylate, arcylonitrile, methacrylonitrile, methacrylamide, N,N-diphenylacrylamide, N,N-di-o-tolylacrylamide, and the like; methyl isopropenyl ketone, methyl vinyl ketone; 1-naphthyl vinyl ketone, methyl vinyl ether, 2-anthryl vinyl ether, vinyl acetate, vinyl arachidate, vinyl chloride, vinylidene chloride, vinylfurane, vinylpyridine, vinylcarbazole, vinylacetylene and other unsaturated hydrocarbons, esters, alcohols, acids, ethers, etc., of the types described. Where the monomer or comonomers to be polymerized are different from the monomer of the polymer support, this process results in a blend of the polymers. Examples of such blends include polyethylene and polyvinyl chloride, polypropylene and polyvinyl pyridine, ethylene-butene coploymer and polybutadiene, ethylene-propylene copolymer and polymethylvinyl pyridine, and the like. The homopolymers, copolymers, and blends can be used to make film, molded articles, and the like.

POLYMERIZATION CONDITIONS

In carrying out a polymerization using the free radical catalyst in accordance with the invention, the monomer to be polymerized is contacted with the catalyst in a reaction zone maintained at suitable polymerization reaction conditions. The temperature is generally within the range of 0° C. to 300° C. and is sufficiently high to effect the decomposition of the free radical precursors into the free radicals. The pressure is generally maintained between 5 p.s.i.a. and 50 atmospheres. The contact time is generally in the range of 30 seconds to 50 hours. The monomer to be polymerized can be in the gas or liquid phase, and can be admixed with a suitable solvent or diluent. The polymerization reaction can be conducted in a fluidized, suspensoid, fixed bed, or moving bed reactor. Solvents or diluents which are suitable include inert gases such as helium, nitrogen and argon, and hydrocarbons having from 3 to 12 carbon atoms such as the alkanes, naphthenes and aromatic hydrocarbons. Examples of suitable hydrocarbon diluents include propane, butane, pentane, hexane, heptane, 3-ethylhexane, octane, 2-methyloctane, decane, dodecane, 2,7-dimethyloctane, cyclopropane, cyclopentane, cyclohexane, methylcyclohexane, cyclooctane, cyclododecane, benzene, toluene, xylene, and the like, and mixtures thereof. The polymerization can be conducted in batch or continuous operations.

In accordance with a further aspect of the invention, it has been found that when conducting a polymerization reaction in the vapor phase utilizing a catalyst comprising a free radical precursor supported on particulate polymer solids as hereinbefore described, the polymer production rate and yield can be significantly increased by conducting the polymerization in the presence of a small amount of a hydrocarbon adjuvant, selected from the group consisting of alkanes having from 5 to 12 carbon atoms, including cycloalkyl substituted alkanes and aryl substituted alkanes; cycloalkanes having 5 to 12 carbon atoms including alkyl substituted cycloalkanes and aryl substituted cycloalkanes; and aromatics having from 6 to 12 carbon atoms, including alkyl substituted aromatics and cycloalkyl substituted aromatics. Specific examples of suitable hydrocarbon adjuvants include pentane, isopentane, neopentane, hexane, 2,3-dimethylbutane, methylpentane, heptane, 2-methylhexane, 3 - ethylpentane, octane, 3 - ethylhexane, nonane, decane, dodecane, cyclopentane, cyclohexane, cycloheptane, cyclooctane, cyclodecane, cyclododecane, methylcyclobutane, ethylcylopropane, methylcyclopentane, ethylcyclohexane, 2 - cyclopropylpentane, 2-cyclobutylbutane, benzene, toluene, para-xylene, meta-xylene, ortho-xylene, 1,2,4,5-tetramethylbenzene, hexamethylbenzene, 1,3-diethylbenzene, and cyclopropylbenzene. The presently preferred hydrocarbon adjuvants have at least five carbon atoms per molecular to provide a reasonable degree of absorption of the hydrocarbon adjuvant on the particulate polymer support of the catalyst or initiator, and less than nine carbon atom per molecule to facilitate the removal of the hydrocarbon adjuvant from the polymerization reaction effluent.

The hydrocarbon adjuvant can be added to the polymerization system in the form of the solvent or diluent utilized to impregnate the free radical precursor on the polymer support, or added separately to the particulate polymer support before or after the free radical precursor is impregnated thereon. The hydrocarbon precursor can be added on a continuous or intermittent basis to a continuous polymerization system and on a continuous intermittent or one-time basis in a batch process. It has been found that for the most effective results in increasing production rate and yield, the hydrocarbon adjuvant should be added in an amount in the range of 0.01 to 40 cc. of hydrocarbon adjuvant per 100 grams of catalyst support particulate polymer solids. While amounts outside of this range can be utilized, smaller amounts do not achieve the maximum effectiveness and larger amounts not only have less than maximum effectiveness but also result in agglomeration of the polymer particles. It is presently preferred that when the hydrocarbon adjuvant is an alkane, the amount will be in the range of about 1 to about 25 cc. of hydrocarbon adjuvant per 100 grams of catalyst support particulate polymer solids; similarly ranges of about 1 to about 15 cc. of hydrocarbon adjuvant per 100 grams of catalyst support particulate polymer solids are presently preferred for cycloalkane adjuvants and aromatic adjuvants.

Generally such a vapor phase polymerization can be conducted at any temperature and pressure at which vapor phase conditions exist for the monomers to be polymerized. However, the pressure will usually be in the range of 5 p.s.i.a. up to the vapor pressure of the monomer system at the operating temperature, and preferably will be in the range of the vapor pressure of the monomer system at the operating temperature down to 10 p.s.i. below such vapor pressure. The temperature will usually be in the range of about 85° F. to about 160° F. The desirable operating temperature will depend upon the catalyst, the monomer, the pressure and other conditions. With diisopropyl peroxydicarbonate as a presently preferred catalyst for the polymerization of vinyl chloride, the temperature will preferably be in the range of about 120° F. to about 145° F., and the pressure will preferably be in the range of 1 to 10 p.s.i. below the vapor pressure of vinyl chloride at the operating temperature. The contact time for the vapor phase polymerization is generally in the range of 30 seconds to 50 hours, and preferably is in the range of about 10 minutes to about 20 hours, and more preferably is in the range of about 15 minutes to about 6 hours. While the polymer support can be any of the materials previously described herein for such use, it is presently preferred that the polymer support be produced from the same monomer which is to be polymerized in the vapor phase polymerization utilizing a hydrocarbon adjuvant.

The following examples are presented in further illustration of the invention, but are not to be construed to unduly limit the invention.

Example I

In Runs 1–3 illustrating the process of my invention the catalysts were prepared by dissolving one gram of free radical precursor in ethanol, absorbing this solution on 50 grams of granular 70–140 mesh polyvinyl chloride, and drying the composite at room temperature. This material was placed in a one-liter autoclave equipped with an anchor-type stirrer, and 6-hour runs were made at 100 p.s.i.g. pressure of vinyl chloride. In Run 4, which was made with a free radical precursor but without a support, other conditions were the same. The conditions and results are set forth in Table I.

TABLE I

| Run No. | Temp., °F. | Free radical precursor | Polyvinyl chloride yield, grams |
|---|---|---|---|
| 1 | 160 | 2,2'-azobis(isobutyronitrile) | 51 |
| 2 | 160 | Benzoyl peroxide | 45 |
| 3 | 180 | do | 66 |
| 4 | 160 | 2,2'-azobis(isobutyronitrile) | [1] 8 |

[1] Product stuck to walls of reactor.

These data show that polymer yield is very low with no support (Run 4), and that a good yield of polymer is obtained when polymerized vinyl monomer is used as a support for the free radical precursor (Runs 1, 2, and 3).

Example II

The procedure of Example I, Run 2 is repeated except the catalyst support is finely divided polyethylene, resulting in a product which is a uniform blend of polyethylene and polyvinyl chloride.

Example III

The procedure of Example I, Run 1 is repeated except the catalyst support is finely divided polypropylene and the monomer to be polymerized is vinylpyridine, resulting in a product which is a uniform blend of polypropylene and polyvinylpyridine.

Example IV

The procedure of Example I, Run 2 is repeated except the catalyst support is finely divided ethylene-butene copolymer and the monomer to be polymerized is butadiene, resulting in a product which is a uniform blend of ethylene-butene copolymer and polybutadiene.

Example V

The procedure of Example I, Run 1 is repeated except the catalyst support is finely divided ethylene-propylene copolymer and the monomer to be polymerized is methylvinylpyridine, resulting in a product which is a uniform blend of ethylene-propylene copolymer and polymethylvinylpyridine.

Example VI

The following runs for the polymerization of vinyl chloride were made in a one-liter autoclave reactor equipped with an anchor-type stirrer using diisopropyl peroxydicarbonate (DIPPODC) initiator supported on a carrier of solid particles of poly(vinyl chloride). The poly(vinyl chloride) support had an inherent viscosity of 0.82 dl./g. in cyclohexanone at 30° C. and was a granular material having a particle size such that all of the particles passed through a 40 mesh (U.S.) sieve and less than 9 weight percent of the particles passed through a 200 mesh (U.S.) sieve. The poly(vinylchloride) support particles were alternately nitrogen flushed and evacuated to remove all air prior to the addition of the support particles to the reactor during nitrogen flushing of the reactor. The reactor was then flushed with vinyl chloride prior to starting the run. The hydrocarbon adjuvant, if any, was added to the support particles in the reactor and the initiator was then added to the reactor as a solution in liquid vinyl chloride, unless otherwise noted. Vinyl chloride was added to the reactor as required to maintain the indicated pressure. The conditions and results are set forth in the following Table II.

TABLE II

| Run | DIPPODC, grams | Carrier, grams | Temperature, °F. | Pressure, p.s.i.g. | Reaction time, hours | Adjuvant | Adjuvant, cc. | Adjuvant, cc./100 g. carrier | Rate,[1] g./g./hr. | Productivity,[2] g./g. |
|---|---|---|---|---|---|---|---|---|---|---|
| 9 | 0.135 | 50 | 140 | 100 | 3 | None | None | None | 98 | 294 |
| 10 | 0.135 | 50 | 140 | 100 | 3 | do | None | None | 97 | 291 |
| 11 | [3] 0.135 | 50 | 140 | 100 | 3 | Pentane [3] | 6.8 | 13.6 | 173 | 519 |
| 12 | [3] 0.135 | 50 | 140 | 100 | 3 | do [3] | 6.8 | 13.6 | 167 | 501 |
| 13 | 0.135 | 50 | 140 | 100 | 3 | Isopentane | 6.8 | 13.6 | 220 | 660 |
| 14 | 0.135 | 50 | 140 | 100 | 3 | Benzene | 6.6 | 13.2 | 263 | 789 |
| 15 | 0.135 | 50 | 140 | 100 | 3 | Methanol | 6.6 | 13.2 | 43 | 129 |
| 16 | 0.135 | 50 | 140 | 100 | 3 | Cyclohexene | 6.6 | 13.2 | 5 | 15 |
| 17 | 0.07 | 100 | 140 | 115 | 1.5 | Neopentane | 6.6 | 6.6 | 768 | 1,152 |
| 18 | 0.07 | 100 | 140 | 115 | 1.5 | Cyclohexane | 6.6 | 6.6 | [4] 1,073 | [4] 1,610 |
| 19 | 0.07 | 100 | 140 | 115 | 1.5 | Cyclopentane | 6.6 | 6.6 | 1,228 | 1,842 |
| 20 | 0.07 | 100 | 140 | 115 | 1.5 | Methylcyclopentane | 6.6 | 6.6 | 989 | 1,484 |
| 21 | 0.07 | 100 | 140 | 115 | 1.5 | None | None | None | 470 | 705 |

[1] Net grams of polymer produced (total polymer product less carrier) per gram of initiator per hour.
[2] Net grams of polymer (total polymer product less carrier) per gram of initiator.
[3] Initiator was added to carrier as a solution in the pentane.
[4] Average for two runs.

Runs 11–14 utilizing a hydrocarbon adjuvant additive in accordance with the invention resulted in significant increases in polymer production rate, in grams of net polymer produced during the polymerization per gram of initiator per hour, over control runs 9 and 10 which did not utilize an adjuvant. However, runs 15 and 16, which utilized adjuvants outside of this aspect of the invention, resulted in significant decreases in the polymer production rate in comparison to control runs 9 and 10. Similarly, runs 17–20, which utilized a hydrocarbon adjuvant in accordance with this aspect of the invention, resulted in significant increases in polymer production rate as compared to control run 21 which did not utilize an adjuvant.

Example VII

Runs for the polymerization of vinyl chloride were conducted in accordance with the procedure of Example VI except as to procedure for adding the adjuvant. The polymerization temperature was 140° F. and the pressure was maintained at 100 p.s.i.g. in each run. The reaction time was 3 hours for each run. In run 22 the initiator and adjuvant were added to the carrier in the reactor by syringe in the form of a pentane solution of the initiator. In run 23 the pentane was added to the carrier in the reactor and then the initiator was added in the form of a solution in liquid vinyl chloride. In run 24 a single solution of the pentane and initiator in liquid vinyl chloride was utilized. The conditions and results are set forth in Table III.

rate of 31 grams of polymer per gram of initiator per hour. The use of an inorganic carrier did not achieve the

TABLE III

| Run | DIPPODC, grams | Carrier, grams | Pentane, cc. | Pentane, cc./100 g. carrier | Rate, g./g./hr. | Productivity, g./g. |
|---|---|---|---|---|---|---|
| 22 | 0.135 | 50 | 6.8 | 13.6 | 167 | 501 |
| 23 | 0.135 | 50 | 6.6 | 13.2 | 168 | 504 |
| 24 | 0.27 | 100 | 13.5 | 13.5 | 167 | 501 |

A comparison of the results of runs 22, 23 and 24 with those for the control runs of Example VI indicates that the increased production rate is achieved for each of the various techniques for adding the adjuvant to the carrier.

Example VIII

Runs for the polymerization of vinyl chloride were conducted in accordance with the procedure of Example VI except as to the changes in condition indicated in Table IV.

high productivity and production rates achieved with the polymer support under the same operating conditions.

Example X

A one liter autoclave equipped with an anchor stirrer was flushed with nitrogen and heated to 140° F. A solution of 0.07 gram of DIPPODC in 28 grams of vinyl chloride was added to the reactor. The reactor was maintained at 140° F. and 115 p.s.i.g. for 1.5 hours so that the monomer was in the vapor phase. The polymer was

TABLE IV

| Run | DIPPODC, grams | Carrier, grams | Temperature, °F. | Pressure, p.s.i.g. | Reaction time, hours | Adjuvant | Adjuvant, cc. | Adjuvant, cc./100 g. carrier | Rate g./g./hr. | Productivity, g./g. | Product polymer condition |
|---|---|---|---|---|---|---|---|---|---|---|---|
| 25 | 0.07 | 100 | 140 | 115 | 1.5 | None | None | None | 470 | 705 | Powder |
| 26 | 0.07 | 100 | 140 | 115 | 1.5 | Pentane | 6.7 | 6.7 | [1] 772 | [1] 1,158 | Do. |
| 27 | 0.07 | 100 | 140 | 115 | 1.5 | do | 13.5 | 13.5 | 828 | 1,242 | Do. |
| 28 | 0.07 | 100 | 140 | 115 | 1.5 | do | 30 | 30 | 578 | 867 | Small amount of soft lumps. |
| 29 | 0.07 | 100 | 140 | 115 | 1.5 | do | 50 | 50 | 369 | 553 | Increased number of soft lumps. |
| 30 | 0.07 | 100 | 140 | 115 | 1.5 | Cyclohexane | 3.3 | 3.3 | 1,127 | 1,690 | Powder. |
| 31 | 0.07 | 100 | 140 | 115 | 1.5 | do | 6.6 | 6.6 | [2] 1,073 | [2] 1,610 | Do. |
| 32 | 0.07 | 100 | 140 | 115 | 1.5 | do | 13.5 | 13.5 | 947 | 1,420 | Do. |
| 33 | 0.07 | 100 | 140 | 115 | 1.5 | do | 20 | 20 | 817 | 1,225 | Some polymer stuck to stirrer and reactor bottom in addition to powder. |
| 34 | 0.07 | 100 | 140 | 115 | 1.5 | do | 30 | 30 | 810 | 1,215 | Some soft lumps. |
| 35 | 0.135 | 50 | 140 | 100 | 3 | None | None | None | 98 | 294 | Powder. |
| 36 | 0.135 | 50 | 140 | 100 | 3 | Benzene | 1 | 2 | 140 | 420 | Do. |
| 37 | 0.135 | 50 | 140 | 100 | 3 | do | 3.3 | 6.6 | 140 | 420 | Do. |
| 38 | 0.135 | 50 | 140 | 100 | 3 | do | 6.6 | 13.2 | 263 | 789 | Do. |
| 39 | 0.135 | 50 | 140 | 100 | 3 | do | 13.5 | 27 | 259 | 777 | Some lumps. |

[1] Average for three runs. [2] Average for two runs.

Runs 25–29 indicate significantly improved production rate and productivity for 6, 7, 13.5 and 30 cc. of pentane per 100 grams of carrier whereas the use of 50 cc. of pentane per 100 grams of carrier not only results in an increase in the number of soft lumps in the polymer product but also results in a production rate and productivity which are less than the corresponding values of control run 25. Thus, it is presently preferred that an alkane adjuvant be utilized in an amount of less than 30 cc. per 100 grams of carrier.

Runs 25 and 30–34 indicate significantly improved production rate and productivity for 3.3, 6.6, 13.5, 20 and 30 cc. of cyclohexane per 100 grams of carrier, but that amount of cyclohexane in excess of about 15 cc. per 100 grams of carrier resulted in the agglomeration of part of the polymer product.

Runs 35–39 indicate significantly improved production rate and productivity for 2, 6.6, 13.2 and 27 cc. of benzene per 100 grams of carrier over control run 35, but that the use of 27 cc. of benzene per 100 grams of carrier resulted in the formation of some lumps in the polymer product.

Example IX

A run was made utilizing a one liter autoclave equipped with an anchor stirrer. One hundred grams of a spray dried microspheroidal silica, commercially available from Davison Chemical Company as 952 MS, was added to the reactor and the reactor was flushed with nitrogen. The flushed reactor was heated to 140° F. and a solution of 0.07 gram of DIPPODC in 48 grams of liquid vinyl chloride was added to the reactor. The reactor was maintained at 140° F. and 115 p.s.i.g. for 1.5 hours so that the monomer was in the vapor phase. The polymer yield was 3.6 grams of a powdery polymer for a productivity of 51 grams of polymer per gram of initiator and a production dark colored and hard particles were coated on the stirrer and the walls of the reactor. The polymer weighed 8.3 grams for a productivity of 118 grams of polymer per gram of initiator and a production rate of 79 grams of polymer per gram of initiator per hour. The omission of the polymer carrier particles and the hydrocarbon adjuvant resulted in low yields and an unsatisfactory polymer product.

Example XI

A run was made utilizing the nitrogen flushed reactor of Example VI wherein 100 grams of the air evacuated and nitrogen pressurized carrier described in Example VI were added to the reactor. With the stirrer operating, 6.6 cc. of cyclohexane was added by syringe. The reactor was then closed and flushed with vinyl chloride three times at 30 p.s.i.g. The reactor was then heated to 140° F. with the stirrer continuing to operate. A solution of 0.07 gram DIPPODC in 101 grams of liquid vinyl chloride was transferred from a nitrogen pressure bomb into the reactor. Fifty grams of vinyl chloride was then pumped into the reactor. Thirty-three minutes after introduction of the initiator into the reactor an additional 100 grams of liquid vinyl chloride was added to the reactor. The temperature was maintained at 140° F. and the pressure at 120 p.s.i.g. for 90 minutes after the introduction of the initiator, under which conditions the vinyl chloride was in the liquid phase, and then the heating was discontinued and the reactor was vented. Upon dismantling the reactor, the polymerization product was found to be sticking to the stirrer and to the heat exchange coil as well as to the bottom of the reactor. The polymer was chipped off and added to the lumpy powder removed from the reactor. The polymer product was dried in a vacuum over at 150° F. for 3 hours. The total dried polymer product was 181.7 grams, of which 100 grams represented the original carrier, and the net polymer produced was 81.7 grams for a productivity of 1167 grams of polymer per gram of initiator and a production rate of 778 grams of polymer per gram of initator per hour. The polymerziation with the monomer in the liquid phase resulted in an unsatisfactory polymer product due to the significant degree of agglomeration.

Example XII

To a nitrogen-flushed one-liter autoclave equipped with an anchor stirrer was added 300 cc. of cyclohexane which had been passed through molecular sieve. The reactor was flushed with vinyl chloride and heated to 140° F. with the stirrer operating. A solution of 0.07 gram DIPPODC in 100 grams of liquid vinyl chloride was transferred from a bomb into the reactor. The pressure in the reactor was 46 p.s.i.g. Twenty-five minutes after the introduction of the initiator into the reactor, an additional 115 grams of liquid vinyl chloride was added to the reactor and the reactor pressure increased to 73 p.s.i.g. The reactor was then maintained at 73 p.s.i.g. and 140° F. for an additional hour and five minutes, at the end of which the reactor was cooled and vented. The then mushy slurry removed from the reactor, including that coated on the heat exchange coil and the stirrer, weighed 219 grams. This slurry was evaporated in a hood and further dried under vacuum at 150° F. for three hours. The net polymer production was 15 grams for a productivity of 214 grams of polymer per gram of initiator and a production rate of 143 grams of polymer per gram of initiator per hour. The polymer product had a low bulk density and was unsatisfactory due to caking. The use of the hydrocarbon adjuvant and a liquid phase monomer to form a liquid phase reaction medium did not achieve the desirable results obtained with a small amount of a hydrocarbon adjuvant and a polymeric carrier supported initiator.

Example XIII

A one liter autoclave was flushed with nitrogen and then 250 cc. of cyclohexane was added to the reactor. The reactor was then flushed three times with vinyl chloride at 30 p.s.i.g. The reactor was heated to 140° F. at 20 p.s.i.g. and a solution of 0.07 gram of DIPPODC in 50 cc. of cyclohexane was pressured into the reactor with nitrogen. Vinyl chloride gas was bubbled into the solution in the reactor for 1–5 hours at a rate of 3920 cc. per hour as the only agitation. The product slurry, 270 cc., was then removed and evaporated. After evaporation, the solid residue was dried in a vacuum oven at 150° F., giving a yield of 5.8 grams of polymer of low bulk density, a productivity of 83 grams of polymer per gram of initiator and a production rate of 55 grams of polymer per gram of initiator per hour. Bubbling a vapor phase monomer through a liquid phase hydrocarbon did not achieve the desirable results obtainable with a vapor phase polymerization using a small amount of a hydrocarbon adjuvant and polymer supported initiator.

Reasonable variation and modification are possible within the scope of the foregoing disclosure and the appended claims to the invention.

I claim:

1. A process for vapor phase polymerization which comprises contacting under vapor phase polymerization conditions at least one monomer having the structure:

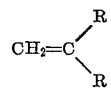

where R is selected from the group consisting of hydrogen, halogen, furyl, pyridinyl, carbazolyl, aryl, alkaryl, alkenyl, alkynyl, halogen substituted aryl, halogen substituted alkaryl, halogen substituted alkenyl, halogen substituted alkynyl, alkoxy substituted aryl, alkoxy substituted alkaryl, alkoxy substituted alkenyl, alkoxy substituted alkynyl, alkenylaryl, —COOR′, —CONR₂′, —C≡N, —COR′, —OR′, and R′COO—, where R′ is selected from the group consisting of hydrogen, alkyl, aryl, alkaryl and aralkyl, not more than one R being hydrogen and the number of carbon atoms in each R being less than 21, with a catalyst comprising a free radical precursor and solid particles of a polymer of at least one monomer having the structure:

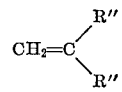

where R″ is selected from the group consisting of hydrogen, halogen, furyl, pyridinyl, carbazolyl, alkyl, aralkyl, cycloalkyl, aryl, alkaryl, alkenyl, alkynyl, halogen substituted aryl, halogen substituted alkaryl, halogen substituted alkenyl, halogen substituted alkynyl, halogen substituted alkyl, halogen substituted aralkyl, halogen substituted cycloalkyl, alkoxy substituted aryl, alkoxy substituted alkaryl, alkoxy substituted alkenyl, alkoxy substituted alkynyl, alkoxy substituted alkyl, alkoxy substituted aralkyl, alkoxy substituted cycloalkyl, alkenylaryl, —COOR‴, —CONR₂‴, —C≡N, —COR‴, —OR‴, and R‴COO—, where R‴ is selected from the group consisting of hydrogen, alkyl, aryl, alkaryl and aralkyl, the number of carbon atoms in each R″ being less than 21, in the presence of a hydrocarbon adjuvant selected from the group consisting of alkanes having at least 5 carbon atoms per molecule, cycloalkanes having at least 5 carbon atoms per molecule, and aromatics having at least 6 carbon atoms per molecule, the amount of said hydrocarbon adjuvant being less than about 40 cc. of hydrocarbon adjuvant per 100 grams of said solid particles.

2. A process in accordance with claim 1 wherein said hydrocarbon adjuvant is selected from the group consisting of alkanes having from 5 to 12 carbon atoms per molecule, cycloalkanes having from 5 to 12 carbon atoms per molecule, and aromatics having from 6 to 12 carbon atoms per molecule, and said amount of said hydrocarbon adjuvant is in the range of about 0.01 to about 40 cc. of hydrocarbon adjuvant per 100 grams of said solid particles.

3. A process in accordance with claim 1 wherein said hydrocarbon adjuvant is selected from the group consisting of alkanes having from 5 to 8 carbon atoms per molecule and being present in an amount in the range of about 1 to about 25 cc. per 100 grams of said solid particles, cycloalkanes having from 5 to 8 carbon atoms per molecule and being present in an amount in the range of about 1 to about 15 cc. per 100 grams of said solid particles, and aromatics having from 6 to 8 carbon atoms per molecule and being present in an amount in the range of about 1 to about 15 cc. per 100 grams of said solid particles.

4. A process in accordance with claim 3 wherein said polymerization conditions comprise a temperature in the range of about 85° F. to about 160° F. and a pressure in the range of about the vapor pressure of the monomer to be polymerized at said temperature to about 10 p.s.i. below said vapor pressure, and a contact time in the range of about 15 minutes to about 6 hours.

5. A process in accordance with claim 4 wherein the first named monomer and the second named monomer are the same.

6. A process in accordance with claim 5 wherein each of said monomers is vinyl chloride, and wherein said free radical precursor is diisopropyl peroxydicarbonate.

7. A process in accordance with claim 1 wherein said polymerization conditions comprise a temperature in the range of about 70° F. to about 190° F. and a pressure in the range of about the vapor pressure of the monomer to be polymerized at said temperature to about 5 p.s.i., and a contact time in the range of about 10 minutes to about 20 hours.

References Cited

UNITED STATES PATENTS

| | | | |
|---|---|---|---|
| 3,157,527 | 11/1964 | Fournet et al. | 260—884 |
| 3,240,843 | 4/1966 | Nelson | 260—884 |
| 3,280,047 | 10/1966 | Cooke | 260—79.3 |
| 3,162,697 | 12/1964 | Canterino | 260—87.8 |

JOSEPH L. SCHOFER, Primary Examiner

J. A. DONAHUE, JR., Assistant Examiner

U.S. Cl. X.R.

260—875, 876, 878, 879, 880, 881, 882, 883, 884, 885, 886, 877, 895, 899, 82.1, 82.3, 83.5, 83.7, 85.3, 85.5, 85.7, 86.1, 86.3, 86.7, 87.1, 87.3, 87.5, 87.7, 88.1, 88.2, 88.3, 88.5, 88.7, 89.1, 89.3, 89.5, 89.7, 91.1, 91.3, 91.5, 91.7, 92.3, 93.1, 93.5, 93.7, 94.2, 94.9; 252—426